United States Patent
Itoh et al.

(10) Patent No.: US 7,518,597 B2
(45) Date of Patent: Apr. 14, 2009

(54) APPARATUS, METHOD AND PROGRAM FOR PERFORMING LAYOUT OPERATIONS ON SPACE

(75) Inventors: Satoshi Itoh, Machida (JP); Takashi Yazaki, Atsugi (JP); Kei Funabashi, Tokyo (JP); Masato Sumita, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 10/960,256

(22) Filed: Oct. 7, 2004

(65) Prior Publication Data

US 2005/0097461 A1 May 5, 2005

(30) Foreign Application Priority Data

Oct. 31, 2003 (JP) ............... 2003-372440

(51) Int. Cl.
*G06F 3/041* (2006.01)
*G06K 9/36* (2006.01)

(52) U.S. Cl. .................. 345/173; 345/181; 382/292
(58) Field of Classification Search ........... 345/173–181
See application file for complete search history.

(56) References Cited

U.S. PATENT DOCUMENTS

| 5,517,578 | A  | * | 5/1996  | Altman et al. ............... 382/181 |
| 6,466,954 | B1 | * | 10/2002 | Kurosawa et al. ........... 715/209 |
| 7,042,809 | B2 | * | 5/2006  | Mignot ....................... 368/223 |
| 7,203,903 | B1 | * | 4/2007  | Thompson et al. .......... 715/203 |

FOREIGN PATENT DOCUMENTS

JP 2001109745 4/2001

* cited by examiner

*Primary Examiner*—Duc Q Dinh
(74) *Attorney, Agent, or Firm*—Jason O. Piche

(57) ABSTRACT

An apparatus for performing a layout operation on space includes a display with a touch panel for displaying space on which a layout operation is performed and controller for tracing a figure drawn by an operator on the touch panel of the display and determining, according to the figure, a field to be inputted and an input mode of the field. A method of performing a layout operation on space including the steps of displaying space on which a layout operation is performed on a monitor with a touch panel, tracing a figure drawn by an operator on the touch panel of the monitor, and determining, according to the figure, a field to be inputted and an input mode of the field. A program to perform the method.

11 Claims, 4 Drawing Sheets

APPARATUS, METHOD AND PROGRAM FOR PERFORMING LAYOUT OPERATIONS ON SPACE

FIELD OF THE INVENTION

The present invention relates to an apparatus, method and program for performing a layout operation on space, and more particularly to an apparatus, method and program for performing a layout operation on newspaper space simply, using a monitor with a touch panel.

BACKGROUND ART

The production of newspaper space may be divided into a layout operation for arranging headlines and articles appropriately, an input and edit operation for the headlines and articles on the laid out space, and a printing operation for the edited space. This invention is concerned with the first layout operation. A layout apparatus for producing the newspaper space is typically composed of a monitor for displaying the space to be laid out and a control unit having a program for supporting the layout operation by an operator. In recent years, a personal computer (PC) has been widely used as the control unit.

The production of newspaper space requires not only correctness but also rapidness. However, the conventional layout operation has been done by skilled operators because it requires experience, and unskilled operators spent a long time to perform the operation. Therefore, a layout apparatus that requires a simple operation at the time of layout, is intuitively easy to understand, and has a smaller number of steps is expected.

For example, Japanese Published Unexamined Patent Application No. 2001-109745 discloses a document layout apparatus which can perform a layout design of excellent quality in a short time, even by a unskilled operator. This document layout apparatus comprises a layout control part controlling the layout, an article data storage part storing news to be laid out, a layout dictionary storing various kinds of information regarding reference layouts used in the past, a headline information storage part storing information regarding headlines for reference, a laid out data storage part storing the laid out data of the space, a display unit and an input unit. Layouts created in the past by skilled operators are accumulated in the layout dictionary, and a layout design is made by selecting a desired layout from the layout dictionary, whereby even a unskilled operator can create a layout of high quality in a short time. However, since this layout apparatus involves selecting a desired layout from among a plurality of layouts created beforehand, the layout design could not be made freely.

SUMMARY OF THE INVENTION

Accordingly, it is an object of the present invention to provide an apparatus, method and program for performing a layout operation on space simply and freely in a short time.

It is another object of the invention to provide an apparatus, method and program for determining easily a plurality of boundary lines defining an input field and its input mode from a figure that an operator has drawn on a touch panel.

Taking a newspaper as an example, the edit operation of the space is divided into two parts. One part is the edit of articles. This is unified with the same font and size over the entire space, and merely requires allocation of columns. The other part is the edit of images and/or headlines. A headline itself is text information, like an article, but is actually treated as image data because a font face or size may be changed so that the headline is appropriately laid out within a field, or hatching may be made. Thus, two kinds of operations are mainly performed on the layout apparatus. This invention aims at this point.

According to a first aspect of the invention, there is provided an apparatus for performing a layout operation on space, comprising display means with a touch panel for displaying space on which the layout operation is performed, and control means for tracing a figure drawn by an operator on the touch panel of the display means, and determining, according to the figure, a field to be inputted and an input mode of the field.

According to a second aspect of the invention, there is provided a method of performing a layout operation on space, comprising the steps of displaying space on which the layout operation is performed on a monitor with a touch panel, and tracing a figure drawn by an operator on the touch panel of the monitor, and determining, according to the figure, a field to be inputted and an input mode of the field.

According to a third aspect of the invention, there is provided a program for causing a computer to execute a method according to the second aspect.

In the first aspect, the space may be newspaper space, and the control means may comprise figure tracing means for tracing the figure drawn by the operator on the touch panel, field determining means for determining the field to be inputted on the newspaper space from the figure traced by the figure tracing means, figure discriminating means for discriminating whether the figure is clockwise or counterclockwise, and input mode determining means for determining the input mode of the field as a headline input mode or an article input mode according to the discrimination result of the figure discriminating means.

The figure tracing means may trace the figure drawn by the operator to detect four points in which each of X and Y coordinates has a maximum or minimum value, and coordinates of a point immediately before each of the four points. The field determining means may select, as upper, lower, left and right boundary lines of the field to be inputted, boundary lines closest to the maximum and minimum values of the X and Y coordinates detected by the figure tracing means from among a plurality of horizontal and vertical boundary lines which define fields on the newspaper space. Particularly, the field determining means may determine column boundary lines closest to the maximum and minimum values of the Y coordinates detected by the figure tracing means as the upper and lower boundary lines of the field to be inputted, and determine character row boundary lines closest to the maximum and minimum values of the X coordinates detected by the figure tracing means as the left and right boundary lines of the field. The figure discriminating means may discriminate between clockwise and counterclockwise figures drawn by the operator by comparing the coordinates of the four points detected by the figure tracing means with the coordinates of the points immediately before the four points.

The second and third aspects may have the same configuration as the first aspect.

BRIEF DESCRIPTION OF THE DRAWINGS

The best mode for carrying out the invention will be described below with reference to the accompanying drawings in which.

BEST MODE FOR CARRYING OUT THE INVENTION

It should be understood that the embodiment described below is only illustrative, the invention is not limited thereto, and various changes or modifications may be made within the scope of the invention as defined in the appended claims.

Figure 1:
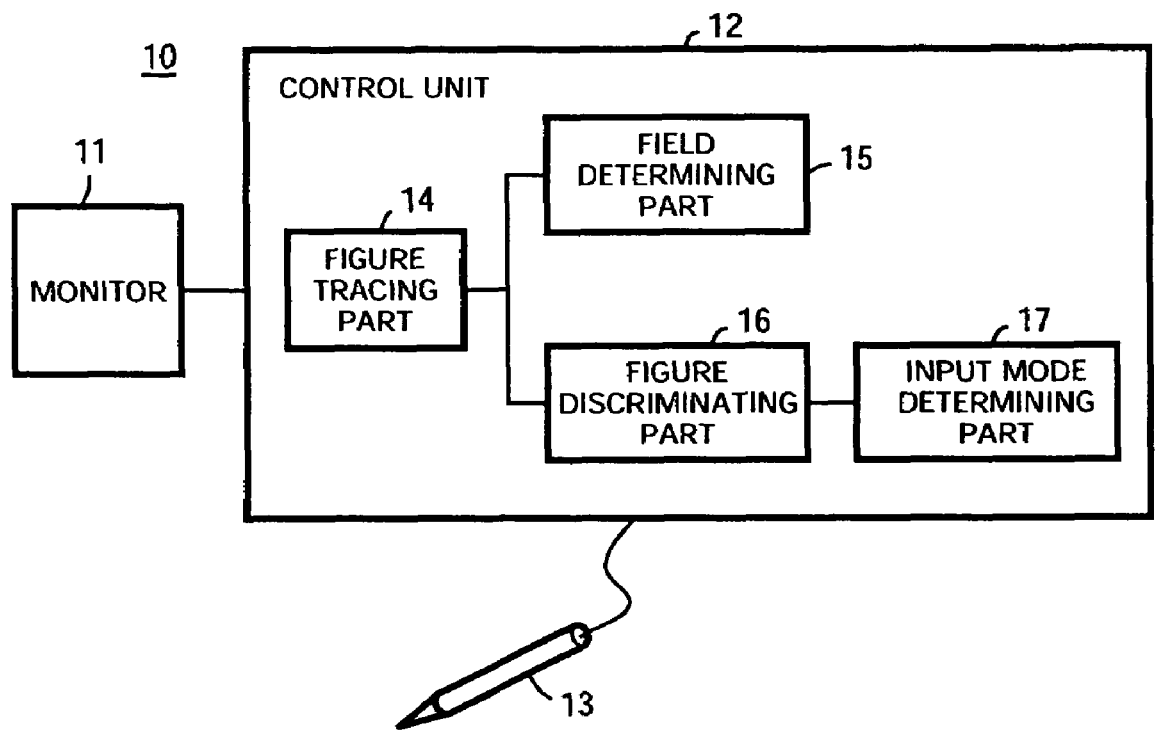
FIG. 1 is a block diagram showing one embodiment of a layout apparatus according to the present invention.

FIG. 1 shows one embodiment of a layout apparatus according to the present invention. The layout apparatus 10 shown comprises a monitor (e.g., a liquid crystal monitor) 11 with a touch panel for displaying space, and a control unit 12 for performing layout operations in accordance with a predetermined program. A stylus pen 13 is connected to the control unit 12 to allow the operator to specify an edit field on the touch panel of the monitor 11. For the convenience of operations, it is preferable that the monitor 11 can display the entire space of one page. If the resolution is as large as about 2560×2048, the entire space of one page can be displayed. Of course, the monitor may display only a part of the space, but it becomes somewhat difficult to determine which portion of the space is being laid out. Though not shown in FIG. 1, other input units such as a keyboard and a mouse, and other output units such as a printer may be connected to the control unit 12.

The control unit 12 comprises a figure tracing part 14 for tracing a figure drawn by the operator on the touch panel of the monitor 11, a field determining part 15 for determining a field to be inputted on the newspaper space from the traced figure, a figure discriminating part 16 for discriminating which figure is drawn, and an input mode determining part 17 for determining an input mode of the field according to a discrimination result of the figure discriminating part. The control unit 12 may take any form, as long as it has a figure tracing function, a field determining function, a figure discriminating function and an input mode determining function. For example, the control unit 12 may be a personal computer running an operating system such as Windows® 2000. In this case, the figure tracing part 14, the field determining part 15, the figure discriminating part 16 and the input mode determining part 17 are realized by a combination of software and hardware.

Figure 2:
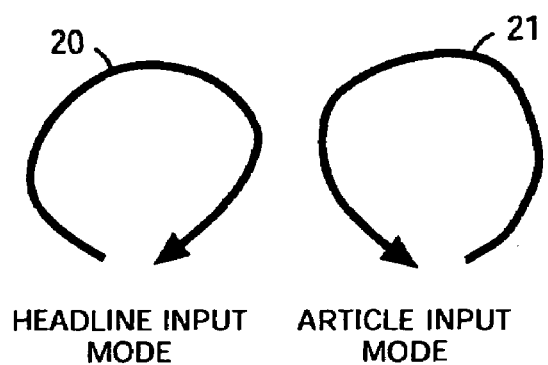
FIG. 2 is a view showing clockwise and counterclockwise figures drawn on the touch panel by the operator.

For the layout apparatus 10 of FIG. 1, it is assumed that the operator draws a clockwise FIG. 20 or a counterclockwise FIG. 21 as shown in FIG. 2, using the stylus pen 13 or operator's finger on the touch panel. In this embodiment, when the operator draws the clockwise FIG. 20, a headline input mode is specified as the input mode, while when the operator draws the counterclockwise FIG. 21, an article input mode is specified. These modes may be specified vice versa.

Next, referring to a flowchart of FIG. 3, the operation of the figure tracing part 14 will be described below, assuming that the FIGS. 20 and 21 in FIG. 2 are used. The figure tracing part 14 samples a drawing operation of the operator on the touch panel at predetermined intervals, detects touch coordinates at each sampling time, and finally acquires the following four points (coordinate points) and four coordinate values.

(Ymax.x, Ymax.y): Point at which the Y coordinate has the maximum value.

(Ymin.x, Ymin.y): Point at which the Y coordinate has the minimum value.

(Xmax.x, Xmax.y): Point at which the X coordinate has the maximum value.

(Xmin.x, Xmin.y): Point at which the X coordinate has the minimum value.

Y'max.x: X coordinate value at a point immediately before a point at which the Y coordinate has the maximum value.

Y'min.x: X coordinate value at a point immediately before a point at which the Y coordinate has the minimum value.

X'max.y: Y coordinate value at a point immediately before a point at which the X coordinate has the maximum value.

X'min.y: Y coordinate value at a point immediately before a point at which the X coordinate has the minimum value.

It is assumed here that the origin (0, 0) of coordinates is located at the upper left corner of the touch panel, in which the X coordinate is incremented as it goes right, and the Y coordinate is incremented as it goes down. When the resolution is 2560×2048, the X and Y coordinates range from 0 to 2559 and from 0 to 2047, respectively.

Figure 3:
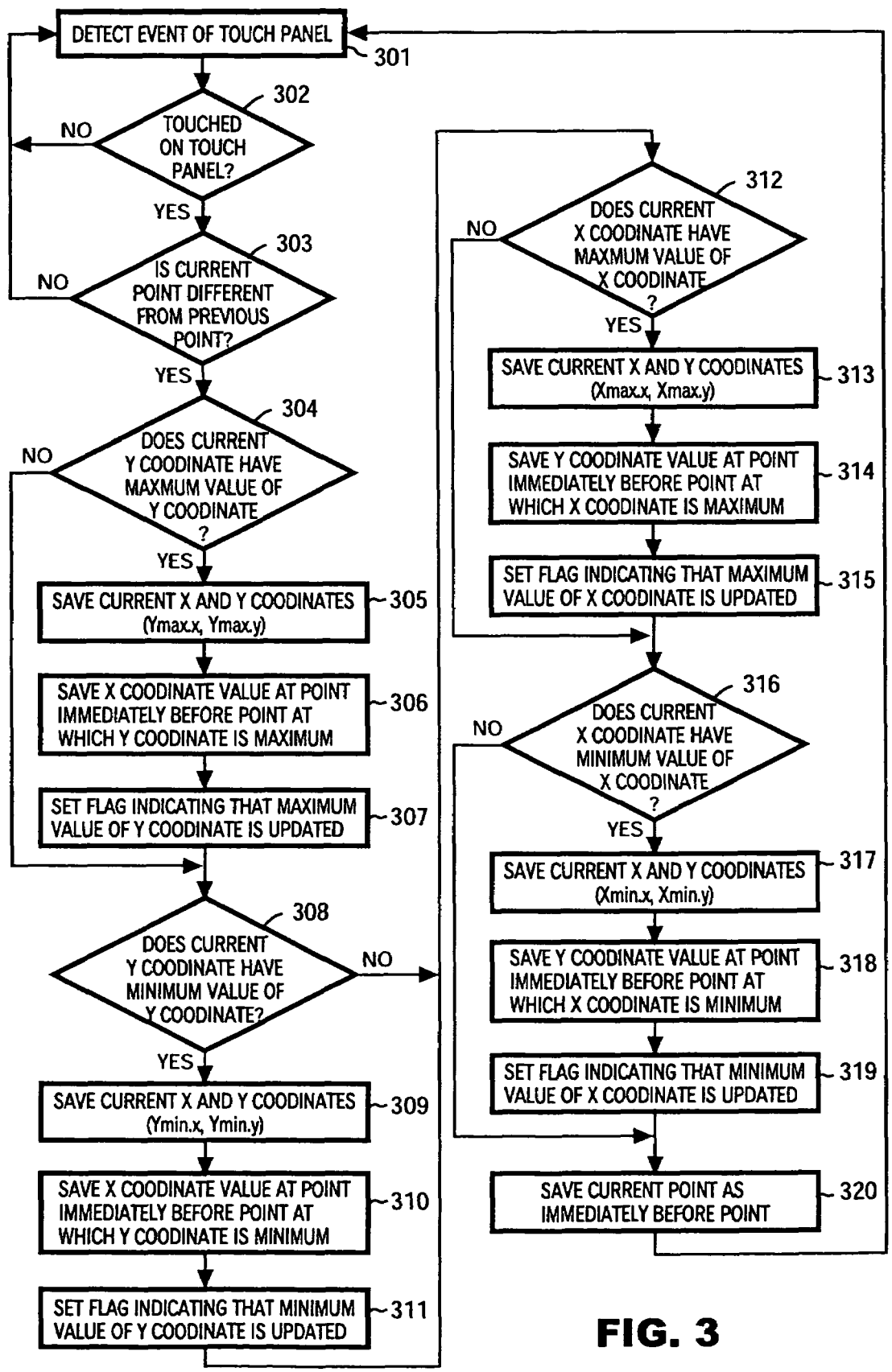
FIG. 3 is a flowchart showing the operation of a figure tracing part.

The flow of FIG. 3 starts with an event detection on the touch panel at step 301. In this embodiment, the events on the touch panel include a first event indicating that the stylus pen 13 or the operator's finger touches on the touch panel, and a second event indicating that the stylus pen 13 or the operator's finger separates from the touch panel. At step 302, it is determined whether or not the first event occurs, namely whether or not the stylus pen 13 or the operator's finger touches on the touch panel. If not, the operation returns to step 301, otherwise proceeds to step 303.

At step 303, it is determined whether or not the touch point detected at step 302 is different from a previous point. When the stylus pen 13 or the operator's finger firstly touches on the touch panel, the previous point does not exist so that the operation takes a NO branch and returns to step 301. At this time, the coordinate values of the first touch point are set as the initial values of the maximum and minimum coordinates. At the second iteration and thereafter, the current point is different from the previous point as the figure is drawn so that the operation proceeds to step 304.

At step 304, it is determined whether or not the current Y coordinate has the maximum value of Y coordinate, namely, $Y \geq Ymax.y$ stands. If it has the maximum value, the operation proceeds to step 305, otherwise branches to step 308. At step 305, the current X and Y coordinates (Ymax.x, Ymax.y) are saved. At step 306, the X coordinate value Y'max.x of a point immediately before the current point having the maximum Y coordinate is saved. Then, at step 307, a flag indicating that the maximum value of Y coordinate is updated is set.

At step 308, it is determined whether or not the current Y coordinate has the minimum value of Y coordinate, namely, $Y \leq Ymin.y$ stands. If it has the minimum value, the operation proceeds to step 309, otherwise branches to step 312. At step 309, the current X and Y coordinates (Ymin.x, Ymin.y) are saved. At step 310, the X coordinate value Y'min.x of a point immediately before the current point having the minimum Y coordinate is saved. Then, at step 311, a flag indicating that the minimum value of Y coordinate is updated is set.

At step 312, it is determined whether or not the current X coordinate has the maximum value of X coordinate, namely, $X \geq Xmax.x$ stands. If it has the maximum value, the operation proceeds to step 313, otherwise branches to step 316. At step 313, the current X and Y coordinates (Xmax.x, Xmax.y) are saved. At step 314, the Y coordinate value X'max.y of a point immediately before the current point having the maximum X coordinate is saved. Then, at step 315, a flag indicating that the maximum value of X coordinate is updated is set.

At step 316, it is determined whether or not the current X coordinate has the minimum value of X coordinate, namely, X≦Xmin.x stands. If it has the minimum value, the operation proceeds to step 317, otherwise branches to step 320. At step 317, the current X and Y coordinates (Xmin.x, Xmin.y) are saved. At step 318, the Y coordinate value X'min.y of a point immediately before the current point having the minimum X coordinate is saved. Then, at step 319, a flag indicating that the minimum value of X coordinate is updated is set. Finally, the current point is saved as an "immediately before" point at step 320, and then the operation returns to the event detection step 301 to repeat the foregoing steps.

The field determining part 15 selects, as upper, lower, left and right boundary lines for the field to be inputted, boundary lines closest to the maximum and minimum values of X and Y coordinates detected by the figure tracing part 14 from among a plurality of horizontal and vertical boundary lines which define fields on newspaper space. In this embodiment, column boundary lines are used as the horizontal boundary lines and character row boundary lines are used as the vertical boundary lines. The field determining part 15 determines an actual field from the handwritten figure having the four extreme values detected by the figure tracing part 14, namely, maximum X coordinate Xmax.x, minimum X coordinate Xmin.x, maximum Y coordinate Ymax.y, and minimum Y coordinate Ymin.y, by adapting the column boundary lines closest to Ymin.y and Ymax.y as the upper and lower sides of the field with the height of "column" on the newspaper layout being used as a unit, and adapting the character row boundary lines closest to Xmax.x and Xmin.x as the right and lefts side of the field with the width of a character row written vertically being used as a unit.

The newspaper space can be defined like a checkerboard with a column and character row being used as a unit. Accordingly, assuming that the height of one column is h, and the total number of columns on the space is n, the Y coordinates of column boundaries extending horizontally are 0, h, 2h, 3h, . . . , nh. Also, assuming that the width of one character row is w, and the total number of character rows on the space is m, the X coordinates of the character row boundaries extending vertically are 0, w, 2w, 3w, . . . , mw. The field determining part 15 finds the sides closest to the four extreme values described above by comparing the extreme values with these coordinates. If an extreme value is located in the center of a column or character row, the smaller coordinates are selected for the lower and right sides of the field, and the larger coordinates are selected for the upper and left sides. The selection may be reversed, or other selections may be used. The selection of upper, lower, right and left sides of the field to be edited may be represented by the following conditional statements.

(1) If Ymax.y>ih+h/2, then set lower side to (i+1)h.
(2) If Ymax.y≦ih+h/2, then set lower side to ih.
(3) If Ymin.y≧ih+h/2, then set upper side to (i+1)h.
(4) If Ymin.y<ih+h/2, then set upper side to ih.
(5) If Xmax.x>jw+w/2, then set right side to (j+1)w.
(6) If Xmax.x≦jw+w/2, then set right side to jw.
(7) If Xmin.x≧jw+w/2, then set left side to (j+1)w.
(8) If Xmin.x<jw+w/2, then set left side to jw.
In the above, i=0, 1, 2, . . . , n−1, and j=0, 1, 2, . . . , m−1.

Figure 4:
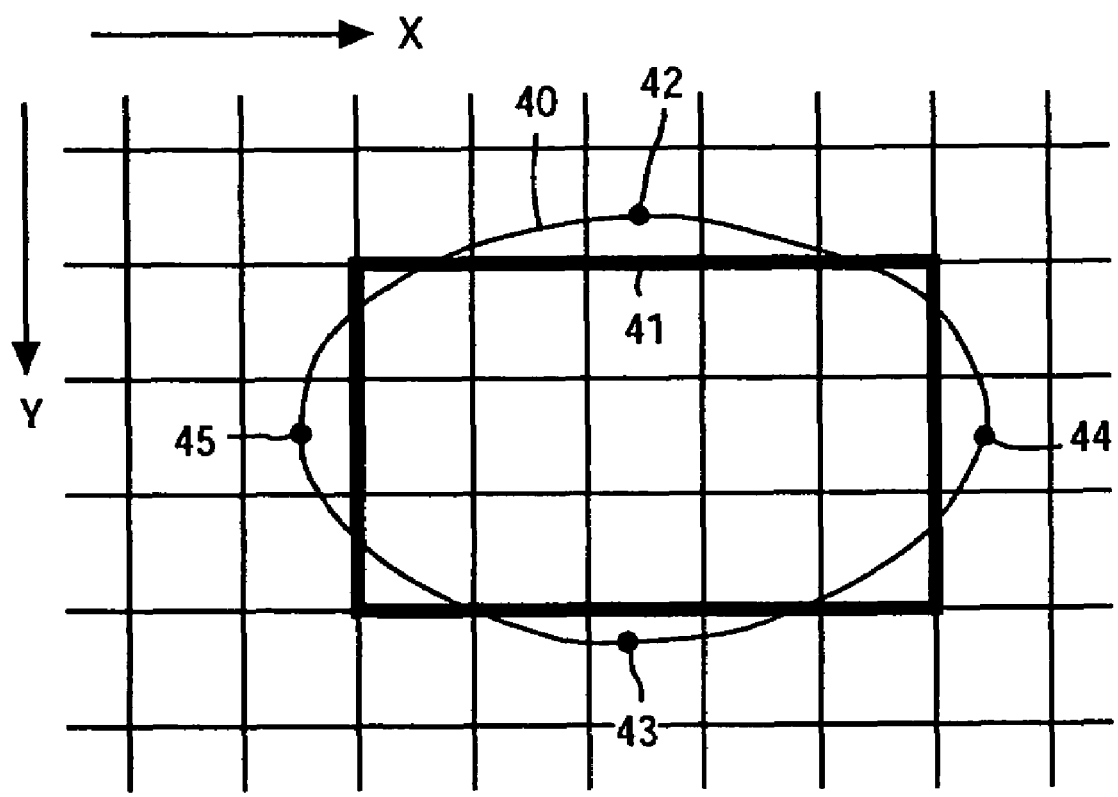
FIG. 4 is a view showing how a field to be edited is determined from the figure drawn by the operator.

FIG. 4 shows one example of a field determined by the above conditional statements. In FIG. 4, a vertical line represents a character row boundary, and a horizontal line represents a column boundary. Although, in actual, the width of a character row is considerably smaller than a column, the character row width is enlarged in FIG. 4 for convenience sake. When the operator draws a FIG. 40 on the touch panel, a field shown by a bold line 41 is determined as a field to be edited. Four points 42 to 45 shown in FIG. 4 are those saved at steps 305, 309, 313 and 317 in FIG. 3, respectively.

Figure 5:
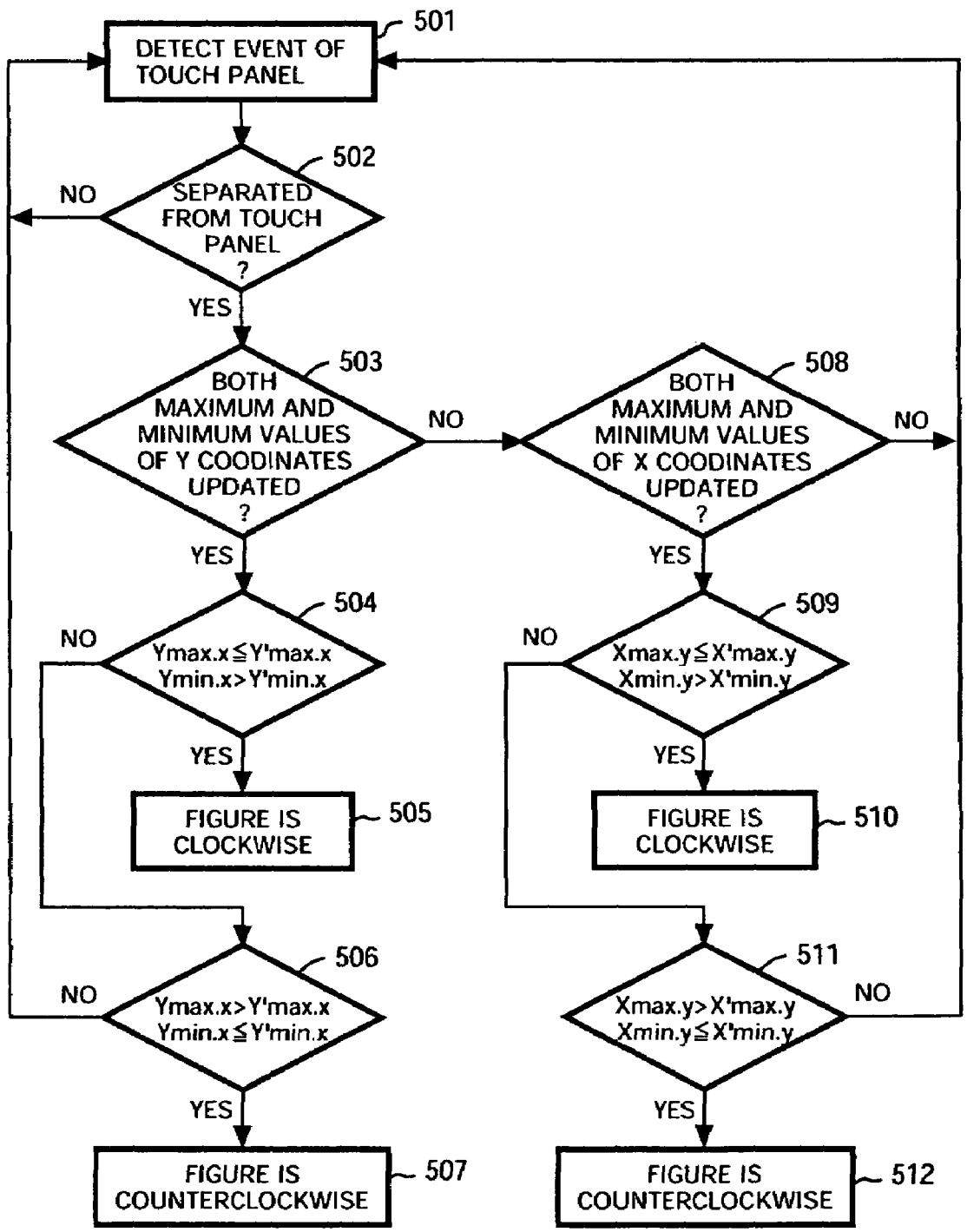
FIG. 5 is a flowchart showing the operation of a figure discriminating part.

Referring to a flowchart of FIG. 5, the operation of the figure discriminating part 16 will be described below. The figure discriminating part 16 discriminates between clockwise and counterclockwise figures drawn by the operator by comparing the coordinates of the maximum coordinate point detected in the flow of FIG. 3 with the coordinates of a point immediately before the former point. The flow of FIG. 5 starts with an event detection on the touch panel (step 501). At step 502, it is determined whether or not a second event occurs, namely, whether or not the stylus pen 13 or the operator's figure is separate from the touch panel. If not, the operation returns to step 501, otherwise proceeds to step 503.

At step 503, it is determined whether or not both the maximum and minimum values of Y coordinate have been updated in the flow of FIG. 3. This is determined based on whether or not the flag has been set at steps 307 and 311 in FIG. 3. If updated, the operation proceeds to step 504, otherwise to step 508.

At step 504, it is determined whether or not Ymax.x≦Y'max.x and Ymin.x>Y'min.x stand. This determines whether a vector to the point at which the Y coordinate has the maximum value is directed left or lower left, and a vector to the point at which the Y coordinate has the minimum value is directed upper right. If yes, it is determined that the figure is clockwise at step 505. If the determination result at step 504 is no, the operation proceeds to step 506 to determine whether or not Ymax.x>Y'max.x and Ymin.x≦Y'min.x stand, namely, whether a vector to the point at which the Y coordinate has the maximum value is directed lower right, and a vector to the point at which the Y coordinate has the minimum value is directed left or upper left. If yes, it is determined that the figure is counterclockwise at step 507, otherwise the operation returns to step 501.

At step 508, it is determined whether or not the maximum and minimum values of X coordinate have been updated in the flow of FIG. 3. This is determined based on whether or not the flags have been set at steps 315 and 319 in FIG. 3. If updated, the operation proceeds to step 509, otherwise returns to step 501.

At step 509, it is determined whether or not Xmax.y≦X'max.y and Xmin.y>X'min.y stand. This determines whether a vector to the point at which the X coordinate has the maximum value is directed right or lower right, and a vector to the point at which the X coordinate has the minimum value is directed upper left. If yes, it is determined that the figure is counterclockwise at step 510. If the determination result at step 509 is no, the operation proceeds to step 511 to determine whether or not Xmax.y>X'max.y and Xmin.y≦X'min.y stand, namely, whether a vector to the point at which the X coordinate has the maximum value is directed upper right, and a vector to the point at which the X coordinate has the minimum value is directed left or lower left. If yes, it is determined that the figure is counterclockwise at step 512, otherwise the operation returns to step 501.

The input mode determining part 17 sets the input mode of the field determined by the field determining part 15 to the headline input mode if the figure discriminating part 16 discriminates the clockwise figure, or sets the input mode to the article input mode if the figure discriminating part 16 discriminates the counterclockwise figure. Alternatively, the input mode determining part 17 may set the input mode to the article input mode if the figure is clockwise, or sets the input mode to the headline input mode if the figure is counterclockwise. Once the input mode is set, a menu (not shown) for inputting a headline or article into the field is displayed on the screen of the monitor 11 to allow the operator to input or edit the headline or article appropriately. Since such menu display and input or edit of a headline or article is well known in the art, and are not directly related to this invention, their detailed explanations are omitted.

While the preferred embodiment of the invention has been described above in detail, this invention is not limited to the above embodiment, and various modifications or changes may be made within the scope of the invention as defined in the appended claims.

What is claimed is:

1. An apparatus for performing a layout operation on space, comprising:
   display means with a touch panel for displaying a newspaper space on which a layout operation is performed; and
   control means for tracing a figure drawn by an operator on the touch panel of the display means, and determining, according to the figure, a field to be inputted and an input mode of the field, the control means comprising figure tracing means for tracing the figure drawn by the orerator on the touch panel, field determining means for determining the field to be inputted on the newspaper space from the figure traced by the figure tracing means, figure discriminating means for discriminating between clockwise and counterclockwise figures drawn by the operator, and input mode determining means for determining the input mode of the field as a headline input mode or an article input mode according to the discrimination result of the figure discriminating means.

2. The apparatus according to claim 1, wherein the figure tracing means traces the figure drawn by the operator, and detects n points, n >1, in which each of X and Y coordinates has a maximum or minimum value, and coordinates of a point immediately before each of the four points.

3. The apparatus according to claim 2, wherein the field determining means selects, as upper, lower, left and right boundary lines of the field to be inputted, boundary lines closest to the maximum and minimum values of the X and Y coordinates detected by the figure tracing means from among a plurality of horizontal and vertical boundary lines which define fields on the newspaper space.

4. The apparatus according to claim 3, wherein the field determining means determines column boundary lines closest to the maximum and minimum values of the Y coordinates detected by the figure tracing means as the upper and lower boundary lines of the field to be inputted, and determines character row boundary lines closest to the maximum and minimum values of the X coordinates detected by the figure tracing means as the left and right boundary lines of the field.

5. The apparatus according to claim 2, wherein the figure discriminating means discriminates between clockwise and counterclockwise figures drawn by the operator by comparing the coordinates of the four points detected by the figure tracing means with the coordinates of the points immediately before the four points.

6. A method of performing a layout operation on space, comprising:
   displaying a newspaper space on which a layout operation is performed on a monitor with a touch panel;
   tracing a figure drawn by an operator on the touch panel of the monitor, and determining, according to the figure, a field to be inputted on the newspaper space and an input mode of the field;
   discriminating between clockwise and counterclockwise figures drawn by the operator; and
   determining the input mode of the field as a headline input mode or an article input mode according to the discrimination result at the figure discriminating.

7. The method according to claim 6, wherein the figure tracing traces the figure drawn by the operator, and detects four points in which each of the X and Y coordinates has a maximum or minimum value, and coordinates of points immediately before the four points.

8. The method according to claim 7, wherein the field determining selects, as upper, lower, left and right boundary lines of the field to be inputted, boundary lines closest to the maximum and minimum values of the X and Y coordinates detected at the figure tracing from among a plurality of horizontal and vertical boundary lines which define fields on the newspaper space.

9. The method according to claim 8, wherein the field determining determines column boundary lines closest to the maximum and minimum values of the Y coordinates detected at the figure tracing as the upper and lower boundary lines of the field to be inputted, and determines character row boundary lines closest to the maximum and minimum values of the X coordinates detected at the figure tracing as the left and right boundary lines of the field.

10. The method according to claim 9, wherein the figure discriminating step discriminates between clockwise and counterclockwise figures drawn by the operator by comparing the coordinates of the four points detected at the figure tracing step with the coordinates of points immediately before the four points.

11. An apparatus for performing a layout operation on a newspaper space, comprising:
    a monitor including a touch panel to display the newspaper space on which a layout operation is performed; and
    a controller for tracing a figure drawn by an operator on the touch panel, the controller comprising a field determining function for determining, according to the figure, the field to be inputted on the newspaper space from the figure traced by the figure tracing function, figure discriminating function for discriminating between clockwise and counterclockwise figures drawn by the operator, and an input mode determining function for determining an input mode of the field as a headline input mode or an article input mode according to the discrimination result of the figure discriminating function.

* * * * *